(12) United States Patent
Guo et al.

(10) Patent No.: US 7,880,826 B2
(45) Date of Patent: Feb. 1, 2011

(54) LIGHT GUIDE PLATE AND LIQUID CRYSTAL DISPLAY USING THE SAME

(75) Inventors: Jian Guo, Beijing (CN); Kiyong Kim, Beijing (CN); Weifeng Zhou, Beijing (CN); Xing Ming, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 74 days.

(21) Appl. No.: 12/126,095

(22) Filed: May 23, 2008

(65) Prior Publication Data

US 2009/0115937 A1    May 7, 2009

(30) Foreign Application Priority Data

Nov. 2, 2007    (CN) .................. 2007 1 0176764

(51) Int. Cl.
*G02F 1/1333* (2006.01)

(52) U.S. Cl. .................. 349/58; 349/61; 349/62; 349/63; 349/64; 349/65; 349/66; 349/67; 349/68; 349/69; 349/70; 349/71; 362/615; 362/619

(58) Field of Classification Search .................. None
See application file for complete search history.

(56) References Cited

U.S. PATENT DOCUMENTS

| | | | |
|---|---|---|---|
| 6,746,129 B2 * | 6/2004 | Ohkawa | 362/625 |
| 6,796,669 B2 * | 9/2004 | Masuda | 362/616 |
| 6,962,429 B2 * | 11/2005 | Yamamoto | 362/614 |
| 7,428,367 B2 * | 9/2008 | Lubart et al. | 385/146 |
| 2007/0263388 A1 * | 11/2007 | Lai et al. | 362/287 |

FOREIGN PATENT DOCUMENTS

| | | |
|---|---|---|
| CN | 1690793 A | 11/2005 |
| JP | 2005-258052 A | 9/2005 |

* cited by examiner

*Primary Examiner*—David Nelms
*Assistant Examiner*—Thanh-Nhan P Nguyen
(74) *Attorney, Agent, or Firm*—Ladas & Parry LLP

(57) ABSTRACT

Disclosed is a light guide plate, comprising a light guide plate body and a plurality of micro mirrors formed on an upper surface of the light guide plate body for controlling a reflection direction of light incident on the light guide plate. The amount of light output from a backlight module using the light guide plate can be controlled by adjusting an angle of each of the micro mirrors with respect to an incident light from a light source.

14 Claims, 3 Drawing Sheets

LIGHT GUIDE PLATE AND LIQUID CRYSTAL DISPLAY USING THE SAME

BACKGROUND OF THE INVENTION

The present invention relates to a light guide plate and a liquid crystal display (LCD) using the light guide plate.

A liquid crystal display (LCD) is one kind of the most widely used flat panel displays due to its advantages such as compact volume, low power consumption, and no radiation. A LCD is formed by assembling an array substrate and a color filter substrate that are opposite to each other. A gate line and a data line intersect each other and are formed on the array substrate to define a pixel region in which a pixel electrode and a thin film transistor (TFT) as a switching element are disposed. A gate signal is applied over the gate line to a gate electrode of the TFT to turn on/off the TFT, and image data signal is applied to the pixel electrode over the data line. A black matrix is disposed on the color filter substrate to prevent light leakage in areas other than the pixel region. A color filter layer is disposed in each pixel region on the color filter area, and a common electrode is disposed on the color filter substrate. A liquid crystal (LC) layer is filled in a space between the array substrate and the color filter substrate to form a LCD panel. The LCD displays images by applying voltages to the pixel electrode and common electrode to generate an electric field in the LC layer, which determines orientations of LC molecules in the LC layer to change polarization of the incident light.

A backlight module is an important component of a LCD and used for providing the LCD panel with light for display and for determining the color representation quality of the LCD. A conventional LCD backlight module is shown in FIG. 1. The backlight module comprises a light source 1 (for example, a cold cathode fluorescent lamp or light emitting diode), a reflective cover 2 around the light source 1, and a reflection plate 3, a light guide plate 4, a first diffuse plate 5, a first prism plate 6, a second prism plate 7, and a second diffuse plate 8 that are stacked in order. A portion of the light from the light source 1 directly enters the light guide plate 4, and another portion is reflected back by the reflective cover 2 and then enters the light guide plate 4. The light is reflected by the underlying the reflection plate 3 and exits from the upper surface of the light guide plate 4 to transmit through the overlaying optical sheets such as the first and second diffuse plates 5 and 8 and the first and second prism plates 6 and 7 before entering a LCD panel. The light guide plate 4 in the above backlight module serves as an optical medium. The overlaying optical sheets such as the first and second diffuse plates 5 and 8 and the first and second prism plates 6 and 7 are used to uniform the light and enlarge view angle.

SUMMARY OF THE INVENTION

According to an embodiment of the present invention, there is provided a light guide plate comprising a light guide plate body and a plurality of micro mirrors formed on an upper surface of the light guide plate body for controlling a reflection direction of light incident on the light guide plate.

Preferably, the micro mirrors may be controllable micro mirrors rotating about an axis parallel to the upper surface of the light guide plate body. The controllable micro mirrors can be connected to a control circuit and the rotation of the micro mirrors can be controlled by the control circuit. The micro mirrors can have a dimension in a range of about 1 micron to about 1 millimeter and have a shape selected from the group consisting of rectangle, circle, diamond, and polygon. The light guide plate body can be formed of a material selected from the group consisting of single crystal silicon, polysilicon, silicon oxide, silicon nitride, and silicon oxynitride.

According to another embodiment of the present invention, there is provided a backlight module, comprising a light source and a light guide plate, wherein the light guide plate comprises a light guide plate body and a plurality of micro mirrors formed on an upper surface of the light guide plate body, and the micro mirrors control a reflection direction of light incident on the light guide plate from the light source.

According to yet another embodiment of the present invention, there is provided a liquid crystal display (LCD), comprising a LCD panel and a backlight module for providing light for the LCD panel, wherein the backlight module comprises a light guide plate comprising a light guide plate body and a plurality of micro mirrors formed on an upper surface of the light guide plate body, and the micro mirrors control a reflection direction to the LCD panel of light incident on the light guide plate from the light source.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

Exemplary embodiments of the present invention will be described hereinafter with reference to the accompanying drawings. It should be understood that in this description when a layer or a element is referred to as being "on" or "connected to" another layer or element, this layer or element can be directly on or directly connected to the other layer or element, or an intervening layer may also be present.

Figure 1:
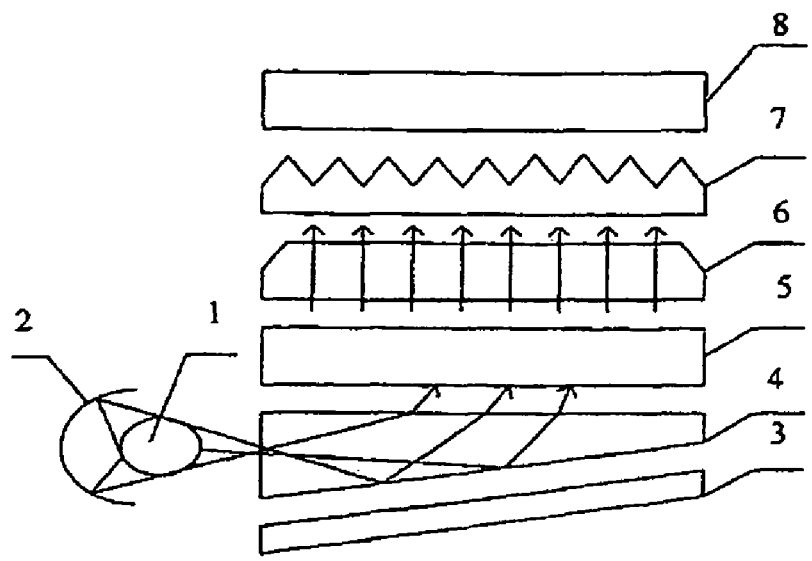
FIG. 1 is a schematic view illustrating a conventional LCD backlight module.
Figure 2:
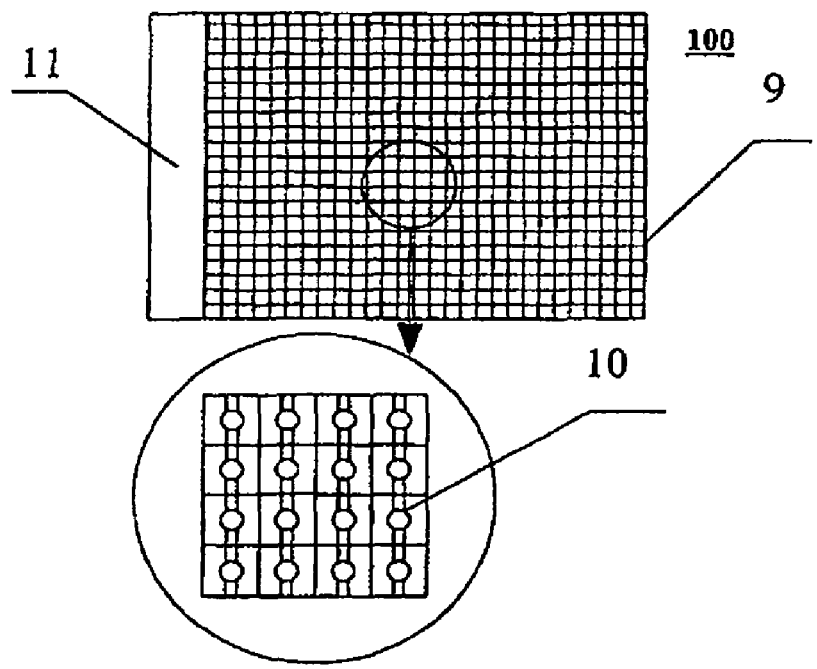
FIG. 2 is a plan schematic view illustrating a light guide plate with a plurality of micro mirrors according to an embodiment of the present invention.
Figure 3:
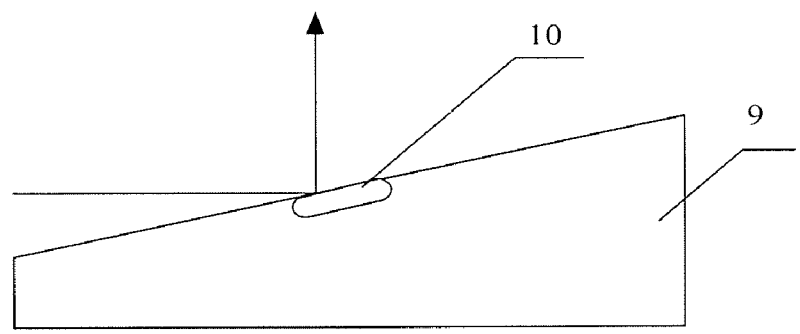
FIG. 3 is a schematic view illustrating a light guide plate according to an embodiment of the present invention.
Figure 4:
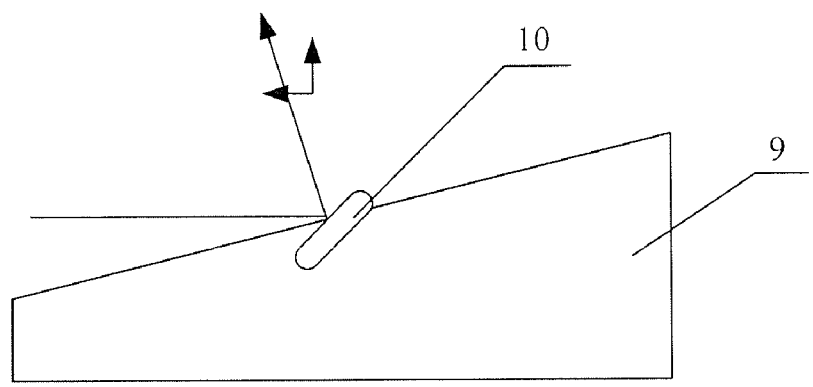
FIG. 4 is a schematic view illustrating a light guide plate according to an embodiment of the present invention.
Figure 5:
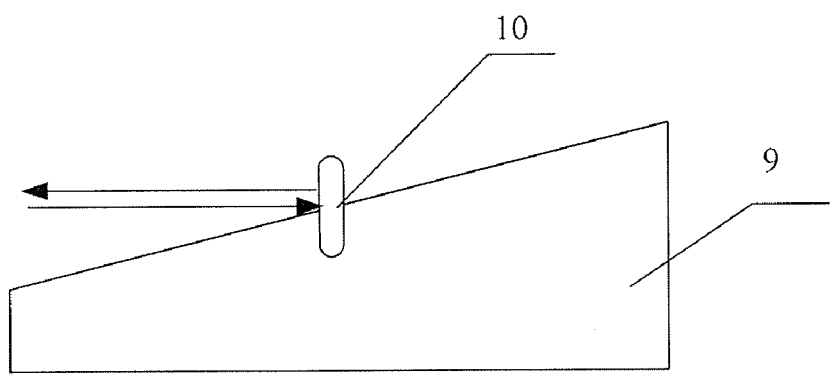
FIG. 5 is a schematic view illustrating a light guide plate according to an embodiment of the present invention.

FIG. 2 is a plan schematic view illustrating a light guide plate with a plurality of micro mirrors according to an embodiment of the present invention, and FIGS. 3~5 show the side views illustrating the operation state of the light guide plate.

As shown in FIG. 2, the light guide plate 100 comprises a light guide plate body 9 and a plurality of micro mirrors formed on the upper surface of the light guide plate body 9. Each micro mirror has a dimension in a range of about 1 micron to about 1 millimeter, preferably about 10 microns. The insert of FIG. 2 shows the enlarged view of the micro mirrors. The shape of each micro mirror can be selected from the group consisting of rectangle, circle, diamond, and polygon. The micro mirrors 10 can be arranged in a matrix and the micro mirrors 10 can be controlled collectively or individually by a control circuit 11 that may be also provided on the same body 9.

In an initial state, no voltage is applied to the micro mirrors by the control circuit 11, and all the micro mirrors are maintained in the state as shown in FIG. 3, which illustrates only one micro mirror 10 by way of example. In the state as shown in FIG. 3, the surface of the micro mirror 10 is coplanar with the upper surface of the light guide plate body 9, such that light from a light source (not shown) of a backlight module is reflected to a LCD panel (not shown) provided above the light guide plate rather than is reflected back into the light source, and in this case, the light output of the backlight module can be the maximum. When a control signal is applied to the micro mirror 10 by the control circuit 1, the micro mirror 10 is rotated by an angle, as shown in FIG. 4. At this time, a part of the light from the light source is reflected back to the light source due to the reflection of the micro mirror. When the micro mirror is rotated to an angle as shown in FIG. 5, all the light from the light source is reflected back and the light output of the backlight module is the minimum. Therefore, the amount of light output from the backlight module can be controlled by a different driving signal applied to the micro mirror 10.

The light guide plate body 9 can be formed of, for example, a silicon-based material selected from the group consisting of single crystal silicon, polysilicon, silicon oxide, silicon nitride, and silicon oxynitride. The light guide plate body 9 can be also made of other kind of material which can provide sufficient strength to perform the above operation.

The micro mirrors on the light guide plate of the present embodiment can be a micro mechanical actuator which control and change the direction of light from the light source at a prescribed angle in a continuous or step manner. The micro mirror can have a dimension in order of microns and can be made by micro machining. The micro mirror each controls the light direction by a rotation operation, that is, the micro mirror is tilted about an axis parallel to the surface of the mirror by an angle through electrostatic actuation, thereby changing the direction of light incident on the mirror surface. The size of the micro mirror may be in the same order of magnitude as one pixel in the LCD panel; therefore, each micro mirror may correspond to a single pixel so that the light input of an individual pixel in the LCD panel can be controlled individually. The micro mirror can be also controlled by other means and mechanism to change the direction of the incident light.

The micro mirror can be formed with various methods in connection with the micro electromechanical system (MEMS). For example, the MEMS process for forming the micro mirror may comprise the following steps, as known in the art.

Firstly, an oxide film is formed on the upper and lower surfaces of a substrate (for example a single crystal silicon substrate) by an oxidation process. Next, a layer of metal film is formed on the oxide film by a sputtering process for example and patterned by photolithography and etching processes to obtain a desired pattern. Then a high reflectivity film such as a metal film, for example, an Al film, is formed on the upper surface of the substrate and patterned by photolithography and etching processes to define a pattern for micro mirrors, driving circuit, wirings, etc. Next, a back etching pattern is transferred to the oxide film on the lower surface of the substrate by a reactive ion etching (RIE) for a subsequent deep silicon etching. Then a RIE is performed on the upper surface of the substrate to form boundary grooves for defining the micro mirrors and other patterns. The micro mirrors can be formed and released by a subsequent back channel etching and a sacrifice layer process. By the above processes, a control circuit and connecting wirings are integrated with an array of micro mirrors. Each of micro mirrors can be controlled individually by an external integrated circuit and reflects the incident light at different angle.

Figure 6:
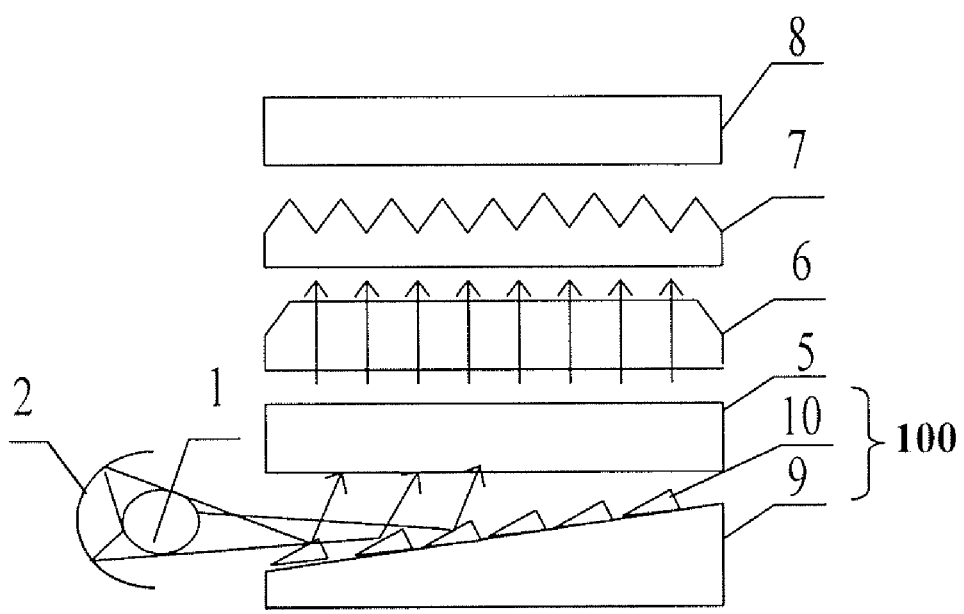
FIG. 6 is a schematic view illustrating a LCD backlight module according to an embodiment of the invention.

The light guide plate according to the above embodiments can be applied to various backlight modules. FIG. 6 is a schematic view illustrating a LCD backlight module according to an embodiment of the invention. As shown in FIG. 6, light from a light source 1 such as a CCFL, LED or other types of light source is incident onto the light guide plate 100 with a plurality of micro mirrors 10 formed on its surface. A reflective cover 2 is disposed around the light source 1 to reflect light back to the light guide plate 100. The light output of the light guide plate 100 can be controlled by the micro mirrors as above mentioned. The backlight module may further comprises other components such as optical sheets, for example, a first diffuse plate 5, a first prism plate 6, a second prism plate 7, and a second diffuse plate 8 sequentially stacked on top of each other on the light guide plate 100, as shown in FIG. 6.

A backlight module with the light guide plate according to the embodiment of the present invention can be employed in a LCD. Since the size of the micro mirror may be in the same order of magnitude as one pixel in the LCD panel, each micro mirror may correspond to a single pixel so that the light input of individual pixel in the LCD panel can be controlled separately. Alternatively, each pixel may also correspond to a plurality of micro mirrors. For example, each pixel may comprise three sub-pixels with different colors. With each sub-pixel corresponding to at least one micro mirror, the light input of individual sub-pixel can be also controlled separately. Therefore, gray scale as well as the color reproduction of each pixel in the LCD can be controlled not only by the LCD panel but also by the backlight module, thus offering more flexibility and freedom in controlling the display quality. For example, a better display quality for a gray scale of full black can be obtained by controlling the micro mirror in a state shown in FIG. 5, in which all the light is reflected back to the light source and thus no light enters the pixel.

The micro mirrors of the light guide plate according to the embodiment of the present invention can be formed using a micro electromechanical system (MEMS) processing method. The micro mirrors may be coated with a high reflectivity film and coupled to a driving circuit and a control circuit. An electrostatic force is generated between the micro mirror and a cantilever holding the micro mirror by the driving circuit so as to rotate the micro mirror by an angle, thus the incident light can be controlled to be reflected towards the overlying LCD panel or another direction. In this way, the light can be adjusted both in the backlight module and the LCD panel to achieve a better display quality and color resolution. According to the embodiment of the present invention, only the light guide plate is modified without affecting the overall structure of the LCD, therefore, the embodiment of the present invention can be applied to both a transmissive type and a transflective type LCD.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A light guide plate comprising a light guide plate body and a plurality of micro mirrors formed on an upper surface of the light guide plate body for controlling a reflection direction of light incident on the light guide plate;
    wherein the micro mirrors are controllable micro mirrors that are capable of rotating about an axis parallel to the upper surface of the light guide plate body.

2. The light guide plate according to claim 1, wherein the controllable micro mirrors are connected to a control circuit and the rotation of each of the micro mirrors is controlled by the control circuit.

3. The light guide plate according to claim 1, wherein the micro mirrors have a dimension in a range of about 1 micron to about 1 millimeter.

4. The light guide plate according to claim 1, wherein the micro mirrors have a shape selected from the group consisting of rectangle, circle, diamond, and polygon.

5. The light guide plate according to claim 1, wherein the light guide plate body is formed of a material selected from the group consisting of single crystal silicon, polysilicon, silicon oxide, silicon nitride, and silicon oxynitride.

6. A backlight module, comprising a light source and a light guide plate, wherein the light guide plate comprises a light guide plate body and a plurality of micro mirrors formed on an upper surface of the light guide plate body, and the micro mirrors control a reflection direction of light incident on the light guide plate from the light source;
    wherein the micro mirrors are controllable micro mirrors that are capable of rotating about an axis parallel to the upper surface of the light guide plate body.

7. The backlight module according to claim 6, wherein the controllable micro mirrors are connected to a control circuit and the rotation of each of the micro mirror is controlled by the control circuit.

8. The backlight module according to claim 6, wherein the micro mirrors have a dimension in a range of about 1 micron to about 1 millimeter.

9. The backlight module according to claim 6, wherein the micro mirrors have a shape selected from the group consisting of rectangle, circle; diamond, and polygon.

10. The backlight module according to claim 6, wherein the light guide plate body is formed of a material selected from the group consisting of single crystal silicon, polysilicon, silicon oxide, silicon nitride, and silicon oxynitride.

11. The backlight module according to claim 6, further comprise at least one diffuse plate and at least one prism plate disposed above the light guide plate.

12. A liquid crystal display (LCD), comprising a LCD panel and a backlight module for providing light for the LCD panel, wherein the backlight module comprises a light guide plate comprising a light guide plate body and a plurality of micro mirrors formed on an upper surface of the light guide plate body, and the micro mirrors control a reflection direction to the LCD panel of light incident on the light guide plate from the light source;
    wherein the micro mirrors are controllable micro mirrors that are capable of rotating about an axis parallel to the upper surface of the light guide plate body.

13. The LCD according to claim 12, wherein each pixel of the LCD panel corresponds to at least one micro mirror.

14. The LCD according to claim 12, wherein the micro mirrors are controlled with a control circuit.

* * * * *